United States Patent [19]

Ziegenbein

[11] Patent Number: 4,598,005
[45] Date of Patent: Jul. 1, 1986

[54] THERMAL INSULATION

[75] Inventor: Botho Ziegenbein, Neckarsteinach, Fed. Rep. of Germany

[73] Assignee: Brown, Boveri & Cie Aktiengesellschaft, Mannheim-Kaefertal, Fed. Rep. of Germany

[21] Appl. No.: 681,114

[22] Filed: Dec. 12, 1984

[30] Foreign Application Priority Data

Dec. 14, 1983 [DE] Fed. Rep. of Germany ....... 3345141

[51] Int. Cl.$^4$ .................... B32B 1/06; B32B 7/02; B32B 15/14; B65D 90/06
[52] U.S. Cl. .................................. 428/69; 220/421; 220/422; 428/74; 428/215; 428/283
[58] Field of Search ............... 220/421, 422, 452; 138/149; 428/69, 74, 215, 285, 332, 333, 457, 283

[56] References Cited

U.S. PATENT DOCUMENTS

| 3,053,715 | 9/1962 | Labino | 138/149 X |
| 3,695,483 | 10/1972 | Pogorski | 220/422 |
| 3,698,588 | 10/1972 | Pogorski | 220/422 |
| 4,201,247 | 5/1980 | Shannon | 138/149 X |
| 4,323,620 | 4/1982 | Iwabuchi et al. | 220/452 X |

Primary Examiner—Allan N. Shoap
Attorney, Agent, or Firm—Herbert L. Lerner; Laurence A. Greenberg

[57] ABSTRACT

Thermal insulation with a double-walled housing, between the two housing walls of which an evacuated space is provided which contains at least one fiber-like insulating material which retards the heat flow between the two housing walls and is arranged perpendicularly to the temperature gradient. The insulating material is formed by glass fibers which are made of at least two different glass materials, and the modulus of elasticity of which remains large at temperatures above 400° C.

3 Claims, 2 Drawing Figures

THERMAL INSULATION

BACKGROUND OF THE INVENTION

1. Field of the Invention

The invention relates to thermal insulation with a double-walled housing with an evacuated space between the two housing walls which space contains at least one fiber-like insulating material which retards the heat flow between the two housing walls and is arranged perpendicularly to the temperature gradient.

2. Description of the Prior Art

Thermal insulation with a double-walled housing finds application, among other things, especially in devices in which heat losses are to be avoided. Thermal insulation is used, for instance, in high-temperature storage batteries of the alkali metal and chalcogen type. The storage cells which are connected together to form a battery, are surrounded by thermal insulation to maintain the required operating temperature of the storage cells which is approximately 400° C. and to prevent the storage cells from being cooled down especially in the operating pauses of the high-temperature storage battery, so that also after the pauses a temperature of 350° to 400° C. prevails in the storage cells, which is a necessary prerequisite for optimum operation of the storage cells.

German Patent Application P 32 35 708.7 (U.S. application Ser. No. 536,178, filed Sept. 27, 1983), discloses thermal insulation which is bounded by a double-walled housing. Between the two housing walls, an evacuated space is provided, into which an insulating compound is filled which retards the heat flow between the housing walls and is arranged perpendicularly to the temperature gradient. In the arrangement described here, the insulating material consists of fibers, preferably of glass fibers. The heat transport in such thermal insulation, the insulating material of which consists of fibers, is composed, with sufficiently low residual gas pressure within the evacuated space, of a solid-body conduction component and a radiation component. The thermal resistance determining the solid-body conduction is formed by the contact surfaces of the glass fibers aligned perpendicularly to the temperature gradient. If the insulating material is subjected to high temperatures, i.e. a temperature of more than 350° C. prevails in the interior of the thermal insulation, the solid-body conductivity increases with rising temperature in case of additional pressure loading of the insulating material, as can be determined by means of measurements. This is found particularly in insulating material which is made of glass fibers manufactured from boron silicate glass. This increase of the solid-body conductivity is due to an increase of the fiber contact areas, since the modulus of elasticity of fibers made of commercially available glasses drops exponentially with increasing temperature.

By using fibers which are made of fused silica or ceramic, this disadvantage can be avoided, but thermal insulation, the insulating material of which is made of these materials, is very expensive.

SUMMARY OF THE INVENTION

It is therefore an object of the invention to provide improved thermal insulation with insulating material of glass fibers in which the thermal insulation property of the insulating material inside the thermal insulation is as good at temperatures between 400° and 500° C., preferably 400° and 600° C. as at substantially lower temperatures.

With the foregoing and other objects in view, there is provided in accordance with the invention, thermal insulation comprising a double-walled housing, an evacuated space between the two housing walls, said space containing insulating material composed of a plurality of fiber-like insulating materials which retard heat flow between the two housing walls and which fiber-like insulating materials are arranged perpendicularly to a temperature gradient between the two walls, said fiber-like insulating materials are made of at least two different glass materials, with said insulating material having a modulus of elasticity which remains sufficiently high when heated to 400°–500° C. to substantially maintain its thermal insulation property at the higher temperature of 400°–500° C. as compared to the temperature below 400° C.

Other features which are considered as characteristic for the invention are set forth in the appended claims.

Although the invention is illustrated and described herein as embodied in thermal insulation, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
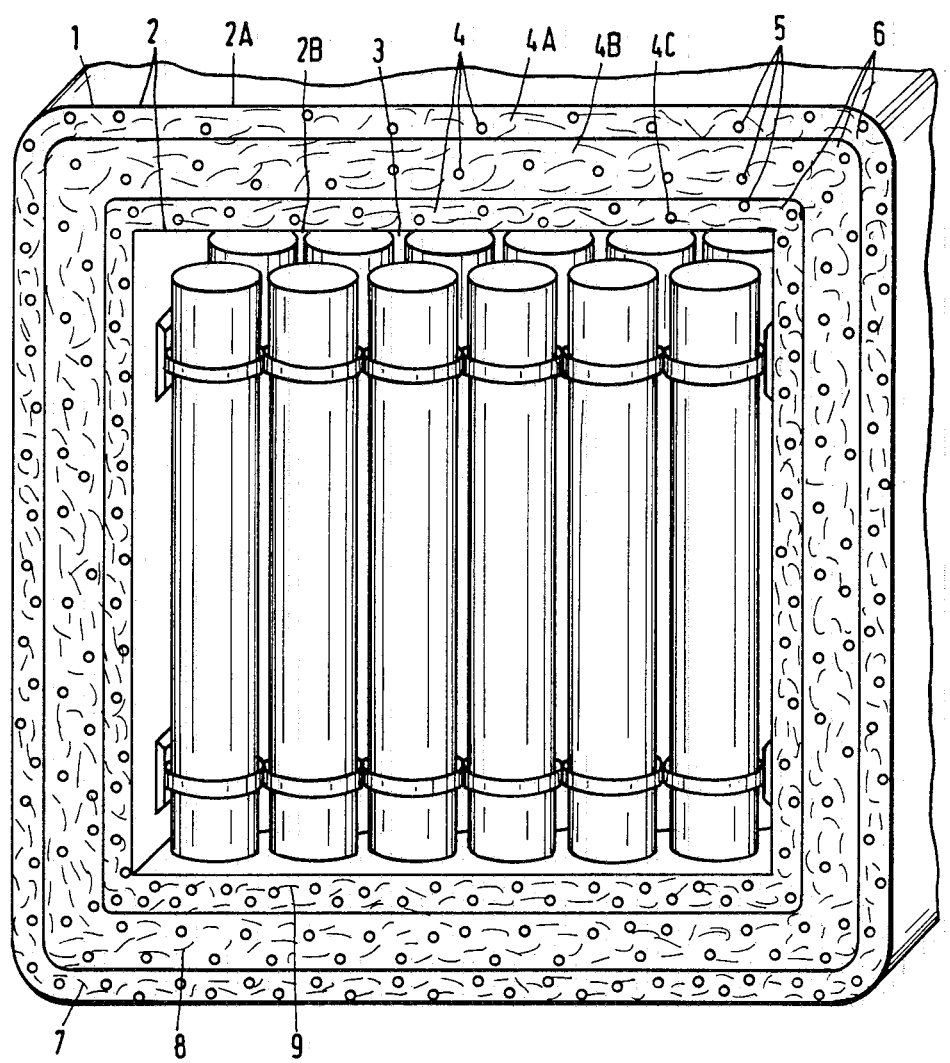
FIG. 1 illustrates a vertical section of thermal insulation comprising a double-walled housing consisting of an outer housing wall and an inner housing wall, three layers of glass fiber made from different glass materials, and with each layer having a different thickness. All the layers are doped with a highly dispersed powder. Electrochemical storage cells are disposed in the inner space, i.e. the space inside of the inner housing wall.

The invention relates to thermal insulation which is bounded by a double-walled housing. Between the outer housing wall and the inner housing wall, an evacuated space is provided, into which insulation, in fiber form, is filled. The insulating material is formed by three layers which are fabricated from glass fibers. The glass fibers are made of different glass materials. Each layer contains a different kind of glass fiber. The layers are arranged one behind the other perpendicularly to the temperature gradient, so that they adjoin each other directly. The outermost layer is adjacent to the inside surface of the outer housing wall, while the innermost layer is adjacent to the outer surface of the inner boundary wall.

The insulating material filled into the evacuated space of the thermal insulation is not made of the same material over the entire thickness. Instead, the insulating material consists of glass fibers which are made of at least two different glass materials. In a preferred embodiment, three layers of glass fibers are disposed within the evacuated space one behind the other and they are arranged perpendicularly to the temperature gradient. The thickness of the layers is chosen with different values; in particular, it is determined by the temperature drop within the insulating material. Three layers of glass fibers with each layer made of different material are arranged within the evacuated space with the layers lying directly against each other and in which the outer layer is adjacent to the inside surface of the outer housing wall and the inner layer is adjacent to the inside surface of the inner housing wall. The outer layer is 10 mm thick and is made of glass fibers which are fabricated of an alkali-lead silicate. The second layer between the inner and the outer layer is 15 mm thick and is made of glass fibers which are fabricated of a soft boron silicate glass. The layer next to the interior of the insulation is 5 mm thick and is made of glass fibers which are fabricated of a hard boron silicate glass. The insulating material used, and especially the glass fibers, exhibit the property of a modulus of elasticity which does not fall below a predetermined value at high temperatures, especially at temperatures of more than 400° C. Glass fibers of alkali-lead silicate preferably have a modulus of elasticity of, say, 4500 kg/mm$^2$ at a temperature of 400° C. The modulus of elasticity of glass fibers of soft boron silicate glass likewise does not fall below a value of, for instance, 5500 kg/mm$^2$ at a temperature of 400° C. The same applies to glass fibers of hard boron silicate glass, which still have a modulus of elasticity of, for instance, 7500 kg/mm$^2$ at such a temperature.

According to the invention, the fiber layers are additionally doped with one or more highly dispersed powders. The powders used should have a particle size which is $\leq 0.3$ to 0.5 $\mu$m.

The invention will be explained in greater detail in the following with reference to the drawings.

FIG. 1 shows the thermal insulation 1 which is bounded by a double-walled housing 2. The latter has a rectangular cross section. The double-walled housing has an inner space 3 which, in the embodiment shown here, serves to receive electrochemical storage cells which operate at 350°–400° C. The outer and inner housing walls 2A and 2B are made of steel or alloy steel. The two housing walls 2A and 2B are parallel to each other at a predeterminable spacing. The spacing between the inner and the outer housing wall 2A and 2B depends on the desired width of the space 6 to be formed which is arranged between these walls and this spacing extends all around the inner housing wall 2B, as shown in FIG. 1. The outer metallic housing wall 2A is made gas-tight; the same applies to the inner housing wall 2B. By these measures the space 6 is made gas-tight. In particular, it is possible to evacuate, i.e. remove air or gas, space 6 permanently. In the embodiment example shown here, the space has a residual gas pressure of less than 0.1 mbar. Before the space 6 is sealed gas-tight and evacuated, the insulating material 4 is filled into it. In the embodiment example shown here, the insulating material 4 consists of three layers 4A, 4B and 4C. The layers are arranged so that they are perpendicular to the temperature gradient. All three layers 4A, 4B and 4C consist substantially of glass fibers. The layers are arranged one behind the other and are directly adjacent. The outer layer 4A rests additionally against the inside surface of the outer housing wall 2A, while the innermost layer 4C adjoins the outside surfaces of the inner housing wall 2B. The three layers 4A and 4B and 4C are made with different thicknesses. According to one embodiment of the invention, the outermost layer 4A is 10 mm thick. The layer next to it, 4B, has a thickness of 15 mm, while the innermost layer 4C is only 5 mm thick. The glass fibers 7, 8 and 9 used for making the layers 4A, 4B and 4C are made of different glass materials. Preferably glass fibers of alkali-lead silicate glass are used for making the layer 4A. Layer 4B is made of glass fibers, for the manufacture of which preferably soft boron silicate glass is used. The glass fibers 9 contained in layer 4C are made of a hard boron silicate glass. In addition, one of the layers and, if desired, all three layers 4A, 4B and 4C can be doped with a highly dispersed powder 5. It is also possible to use different powders for doping. According to the invention, the powders should have a particle size of only 0.3 to 0.5 $\mu$m. Silica powder is preferred for the additional doping of the layers with one or more powders.

Figure 2:
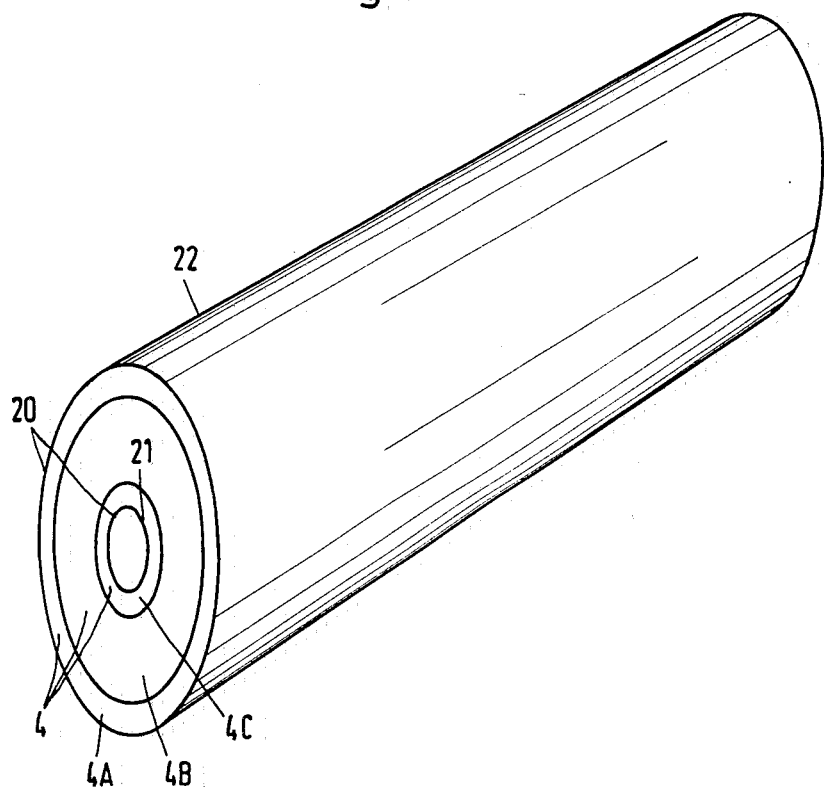
FIG. 2 is a perspective view of a pipeline with the thermal insulation. In the center is a pipe through which hot or cold fluids flow. Surrounding the center pipe is a larger outer pipe. The space in-between the two pipes is filled with three layers of glass fibers with the fibers of each layer made from a different material.

FIG. 2 shows a further embodiment of the thermal insulation. The latter is arranged here about a piping system 20, within which flowing hot gases are transported. However, deep-cooled media such as liquid gases can also be transported within the piping system 20. The piping system 20 is formed by two pipes 21 and 22 which have different diameters. In particular, the pipe 21 having the smaller diameter is arranged concentrically within the pipe 22. Thereby, a uniform space between the two pipes 21 and 22 is created which serves as the space which is to be evacuated and which receives the insulating material 4. At the ends of these two pipes 21 and 22, the space between pipe 21 and pipe 22 is sealed gas-tight by metallic washers (not shown here). Here, too, the insulating material 4 is formed by three layers 4A, 4B and 4C which are designed in the same manner as the layers shown in FIG. 1. The three layers are arranged perpendicularly to the temperature gradient. They have the same dimensions as the layers shown in FIG. 1. Additional doping of the layers with highly dispersed powder may also be carried-out here.

The invention is not limited to the embodiment examples shown in FIGS. 1 and 2 but includes all thermal insulations which have several layers as insulating material, which are made of different glass fibers and which have the property that their modulus of elasticity does not fall below a fixed minimum value also at very high temperatures.

There is claimed:

1. Thermal insulation comprising a double-walled housing, an evacuated space between the two housing walls, said space containing insulating material composed of three layers of fiber-like insulating materials which retard heat flow between the two housing walls, each said layer is made of a different glass material and the layers are arranged contiguously in the evacuated space one behind the other perpendicularly to a temperature gradient between the two walls in which the outermost layer which adjoins the inner faces of the outer housing wall is made of fibers of alkali-lead silicate glass and is 10 mm thick, the central layer is made of fibers of soft boron silicate glass and is 15 mm thick, and the innermost layer made of hard boron silicate glass, is 5 mm thick and is contiguous to the outer faces of the inner housing wall.

2. Thermal insulation according to claim 2, wherein the glass fibers are doped at least partly with one or more highly dispersed powders which have a particle size of at most $\leq 0.3$ to 0.5 $\mu$m.

3. Thermal insulation according to claim 2, wherein all the layers are doped with one or more highly dispersed powders whose particle size is at most 0.3 to 0.5 $\mu$m.

* * * * *